United States Patent [19]

Briones

[11] Patent Number: 4,862,646

[45] Date of Patent: Sep. 5, 1989

[54] APPARATUS AND METHOD FOR PRODUCTION OF SINGLE ELEMENT TORIC LENSES OF VERY SMALL PROPORTIONS

[75] Inventor: Robert A. Briones, Colorado Springs, Colo.

[73] Assignee: Laser Magnetic Storage International Company, Colorado Springs, Colo.

[21] Appl. No.: 247,667

[22] Filed: Sep. 22, 1988

Related U.S. Application Data

[63] Continuation of Ser. No. 823,563, Jan. 28, 1986.

[51] Int. Cl.$^4$ ............................................. B23C 3/05
[52] U.S. Cl. ............................. 51/105 LG; 51/124 L; 51/97 R; 51/284 R
[58] Field of Search ............... 51/5 R, 284 R, 284 E, 51/97 R, 105 LG, 124

[56] References Cited

U.S. PATENT DOCUMENTS

| | | | |
|---|---|---|---|
| 1,426,147 | 8/1922 | Bugbee | 51/284 |
| 2,589,488 | 3/1952 | Fowler. | |
| 2,890,551 | 6/1959 | Dalton. | |

OTHER PUBLICATIONS

Zhdanov Technological Equipment Plant, pp. 45-48, Dec. 1972.

Primary Examiner—Frederick R. Schmidt
Assistant Examiner—Blynn Shideler
Attorney, Agent, or Firm—Sheridan, Ross & McIntosh

[57] ABSTRACT

A system for generating toric optical surfaces having two different radii (or axes) of curvature with accurate centration. A multiplicity of such surfaces for use as lenses are simultaneously created. Each surface is mounted transversely to the periphery of a spinning disk of a radius equal to one of the desired arcs. Generating, lapping and polishing tools are rotated about an axis perpendicular to the disk's axis but displaced from the disk's axis by an amount equal to the difference between the radii of the desired arcs.

6 Claims, 9 Drawing Sheets

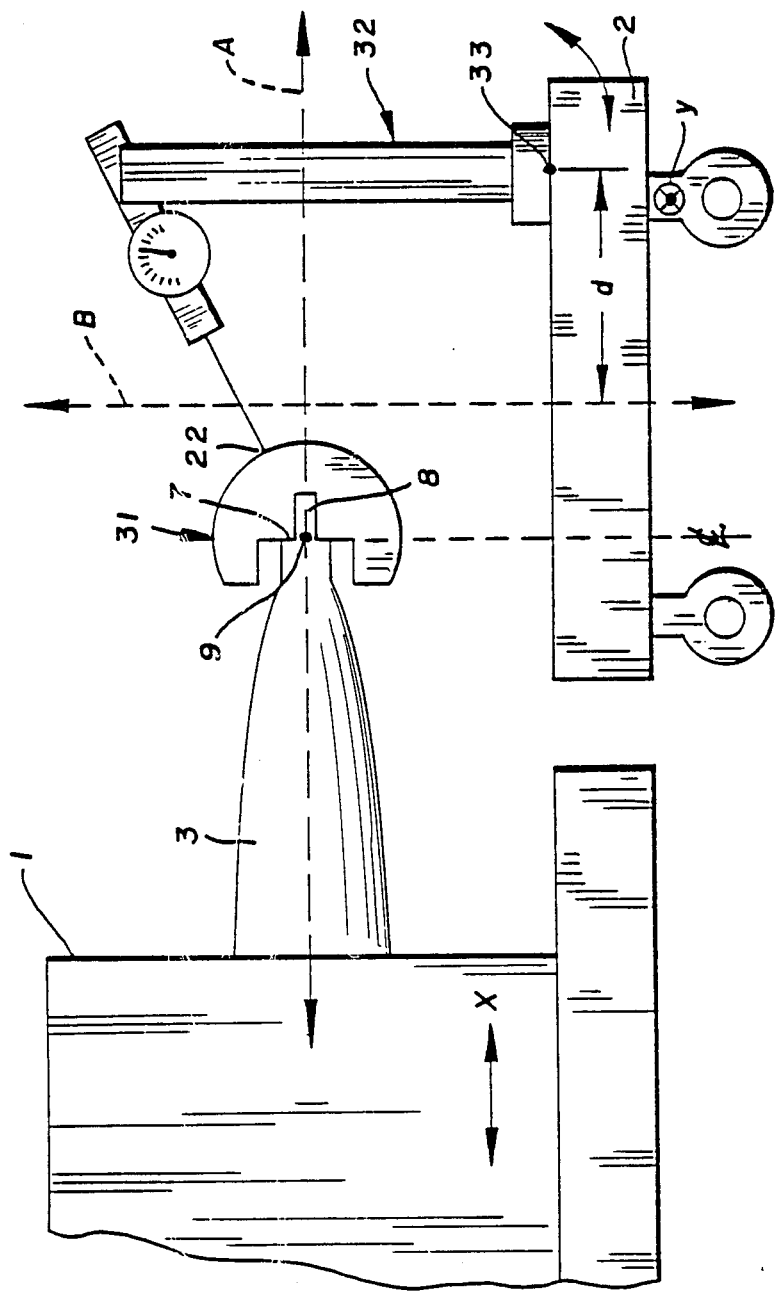

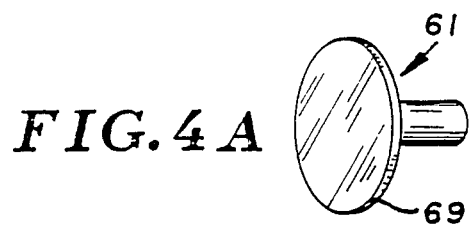
FIG.4A
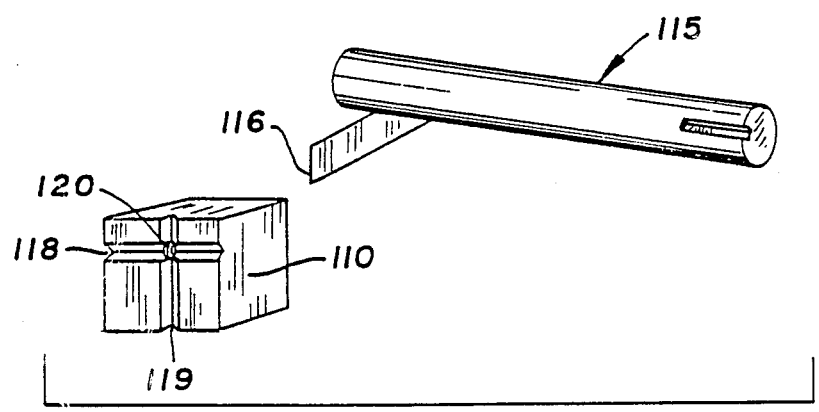
FIG.4B
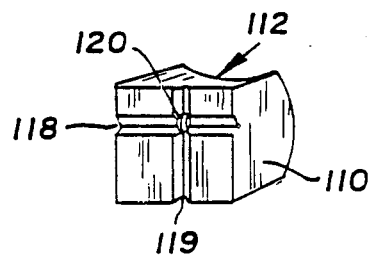
FIG.4C
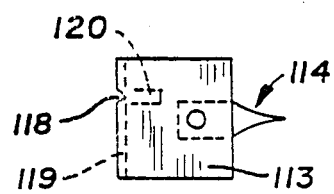
FIG.4D
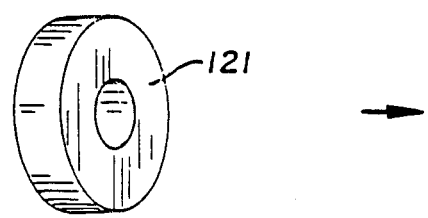
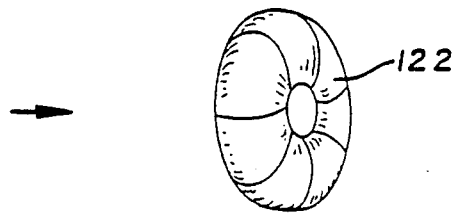
FIG.4E          FIG.4F

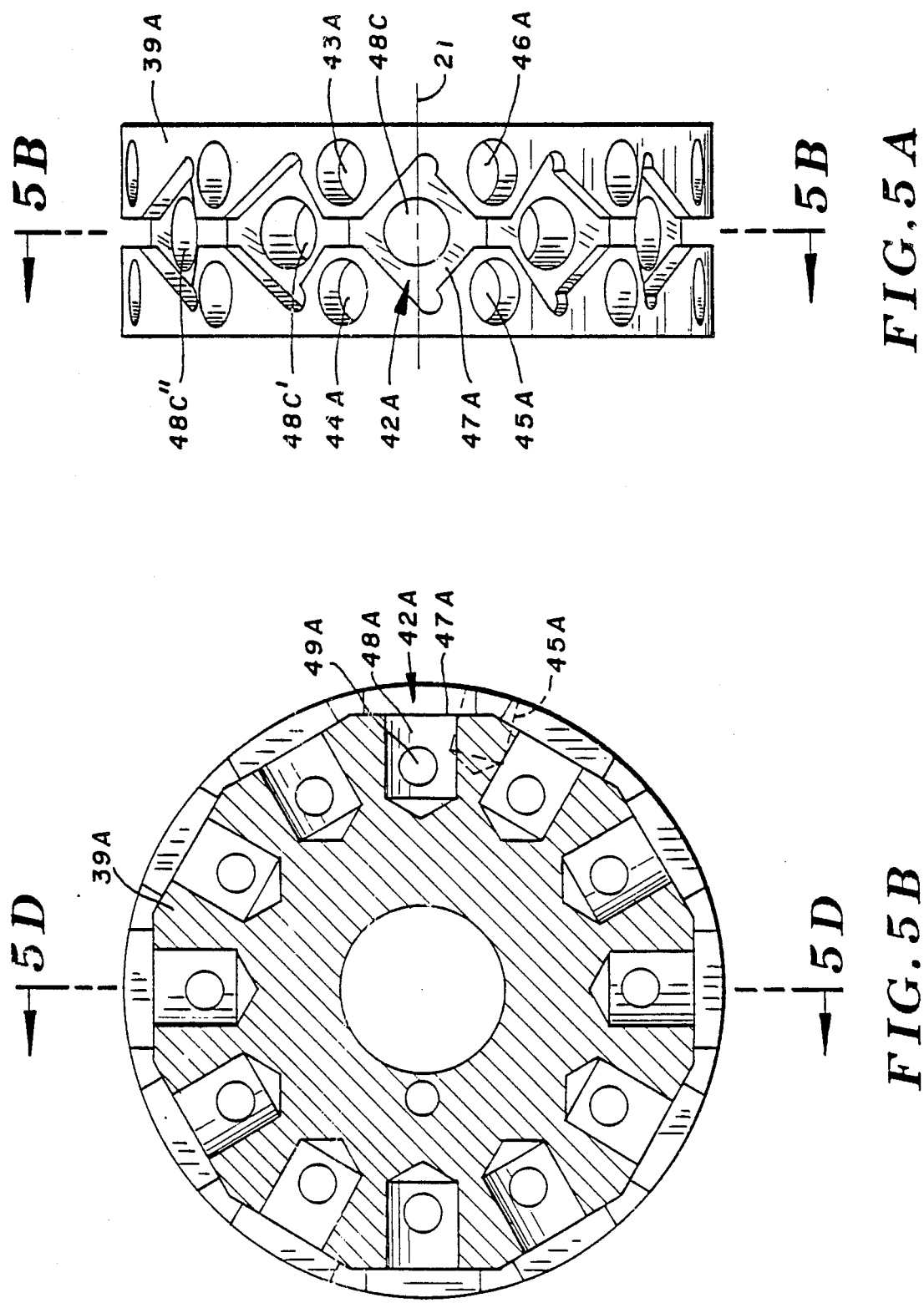

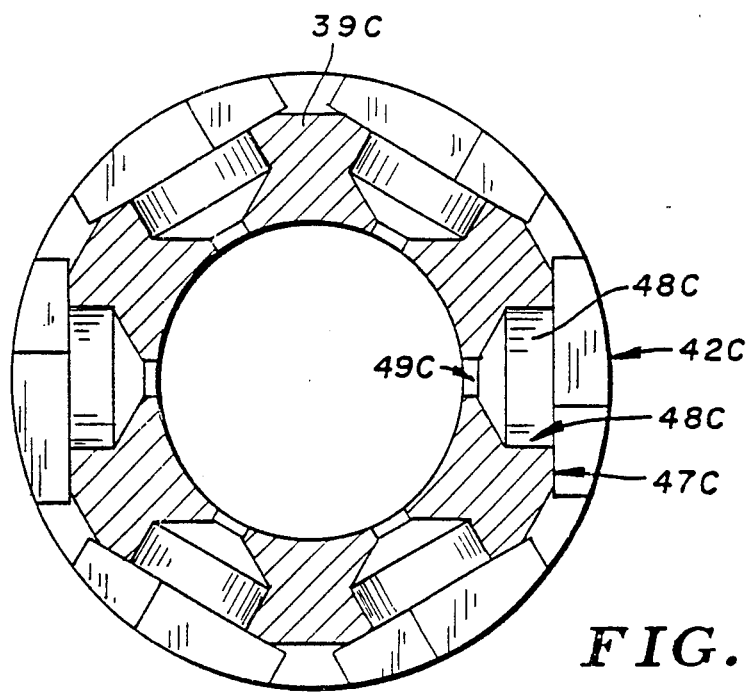
FIG.5C
FIG.8
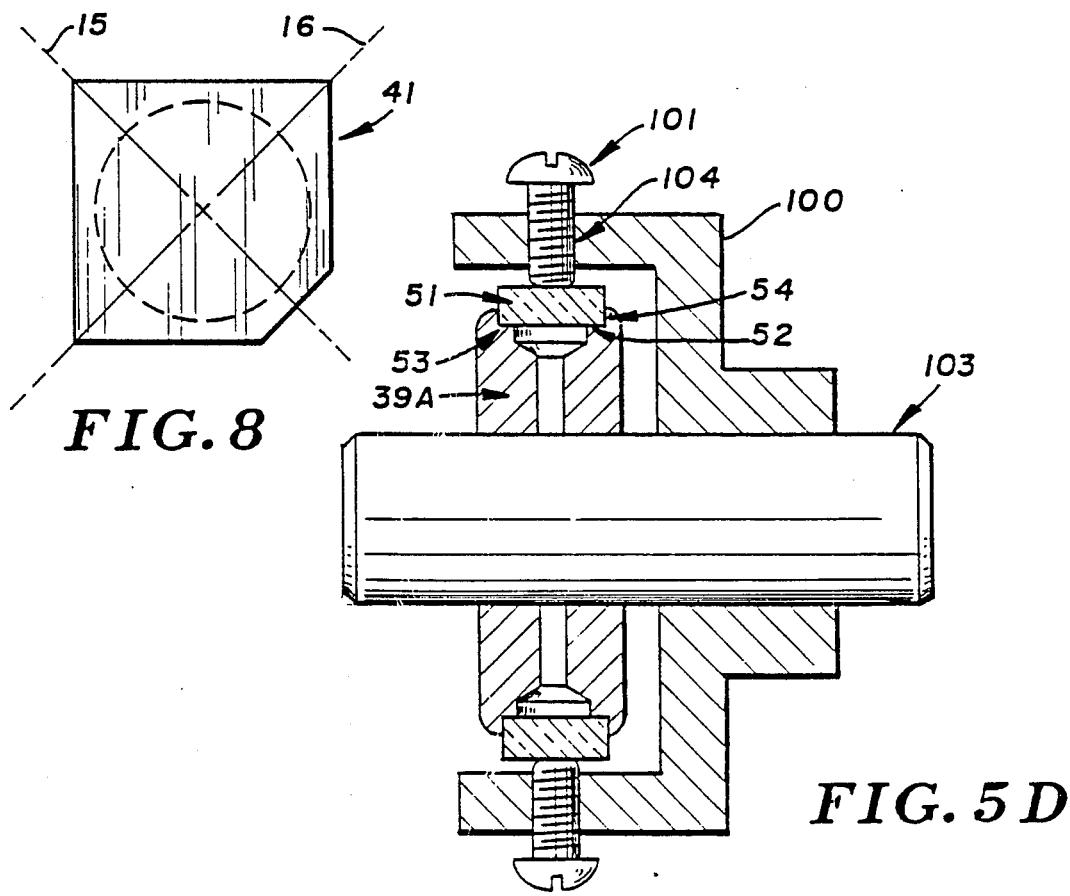
FIG.5D

APPARATUS AND METHOD FOR PRODUCTION OF SINGLE ELEMENT TORIC LENSES OF VERY SMALL PROPORTIONS

This is a continuation of application Ser. No. 823,563, filed Jan. 28, 1986.

This invention relates to the field of optical element production systems and techniques and, more specifically, to such systems and techniques which are capable of producing a plurality of single lens elements having two radii of curvature of different dimensions and of transverse orientation.

BACKGROUND

This invention was created to fill a void in the lens making field, that is, the efficient production of high quality toric lenses of small dimension. Previous to this invention there was no known device or system which could repeatedly mass produce the toric lenses to the precision required. The precision toric lenses produced by this invention are required at least in situations where two orientations of an astigmatic light beam must be focused differently in order to produce a useable image on the plane of focus. This invention produces a lens which at least can provide two foci as lines, separated by a specified distance, at a specified mean focal length. The most immediately recognized use of such lenses is for the purpose of providing electronic servo information as developed by Briscot et al (1976), in "Optical Readout of Videodisc" *IEEE Transactions-Consumer Electronics* (CE-22,304). Also, a lens of the type produced by this invention could be used to replace lenses like those described in U.S. Pat. No. 4,027,952, issued to Hugues. Unlike the lenses in Hughes, however, the lenses produced by this invention have one active optical surface with two curvatures. Likewise, patents by McLeod, U.S. Pat. No. 2,146,905 and Ross, U.S. Pat. No. 2,120,263 show alternate uses for toric lenses.

Other methods and systems have been devised for producing toric lenses, but none have provided the ease of use, quantity of throughput, or accurate centration which is available from the invention described herein. For example, U.S. Pat. No. 3,117,396 issued to Dalton, acknowledges the introduction of elipticity into lenses using its teachings (at lines 39-56). Some, for example, U.S. Pat. No. 3,900,972, issued to Rupp, can produce only concave torics lenses, whereas the invention taught herein produces convex surfaces.

Also, all art known to the inventor is useful for production of opthalimic lenses of a size roughly 38 mm to 150 mm in diameter with similar focal lengths, unlike this invention which is useful for production of higher quality lenses with a focal length on the order of 20 to 120 millimeters. The production of larger or smaller machines of similar construction to this invention would obviously produce larger or smaller lenses than those described herein with a high degree of accuracy, but the system described herein was engendered to produce smaller lenses than available from opthalmic lens machines.

SUMMARY OF THE INVENTION

A basic description of the invention described in this patent can most usefully be made with reference to FIG. 1 in which a plane "C" is shown. Oriented in plane C are lines of direction "X" and "Y", and perpendicular to them and through the plane C, line of direction "Z." The operation of the machine requires the use of two elements, both having translational mobility within plane C. These elements are: element 1, which is capable of translational movement along the X directions and element 2 which is capable of translational movement along the Y directions. To achieve the high degree of precision required for production of the lenses described above, translational movement in the X and Y directions must be made with a very high degree of accuracy, on the order of one thousandth of an inch. Element 1 contains a spindle with an axis "A" positioned parallel to plane C and directions X. Element 2 comprises a stage 4 parallel to plane C, which is planar (and circular in the preferred embodiment) and which is rotatable around axis B. Axis B is perpendicular to the surface of stage 4 and plane C. Element 2 is capable of translational motion in the Y directions to the same degree of accuracy as is element 1's movement.

In short, the rough lens blanks are mounted on a torus or doughnut-shaped holding fixture (specially designed for holding the lenses) which is mounted on (or around) the spingle so as to turn about axis A.

The astigmatic/toric lenses have two radii of curvature, minor and major radii, explained in detail later. (see FIG. 2A). The center rotation of the doughnut, (Axis "A") is initially aligned to Cross Axis "B", (the center of rotation of the tooling) for calibration. Axis B is then translated by means of Stage 4 along the Y direction such that the origin of the minor radius will be displaced relative to the origin of the major radius. the difference in origins (and axis A and B) will result in the eccentricity/toricity on surfaces cut onto the periphery of the lenses. The basic shaping, lapping, and polishing of the lenses on the surface of the doughnut is accomplished by a set of surfacing tools which are mounted, as needed, above stage 4.

The tooling is held to the surface (of the lens) to be shaped, lapped, or polished, by the rotation of stage 4 about the B axis (at the height of the minor radius relative to stage 4). In this way the tooling is driven across the major radius of the forming lens surface by rotation about the B axis and simultaneously driven across the minor radius by rotation of the holding fixture about the A axis.

Described below are detailed methods for generating the required tooling and set-up of this invention to accomplish the shaping, lapping, and polishing of the lenses as desired.

BRIEF DESCRIPTION OF THE DRAWINGS

FIG. 3 is a schematic representation of the calibration method. The dial indicator sensor on the rotatable disc (stage 4) and spindle with reference sphere are used in the preferred embodiment.

FIG. 4 is a set of FIGS. (4A, 4B, 4C, 4D, 4E, and 4F), each of which describes one or more of the surfacing tools empoyed in the shaping, lapping, and polishing of the toric lenses or of the cutting, shaping, tools used to create surfacing tools in the preferred embodiment.

FIG. 5 is an illustration of the doughnut shaped lens holding fixture used by the preferred embodiment. FIGS. 5A and 5C are edge side views of alternate embodiments, FIG. 5B is a crossection of FIG. 5A taken at line 5B—5B thereof. FIG. 5D includes a cross section of the holding fixture of 5B taken at line 5D—5D threof which is a holding ring for press-mounting.

FIG. 8 is a front view of a lens.

DETAILED DESCRIPTION OF THE PREFERRED EMBODIMENT

Figure 1:
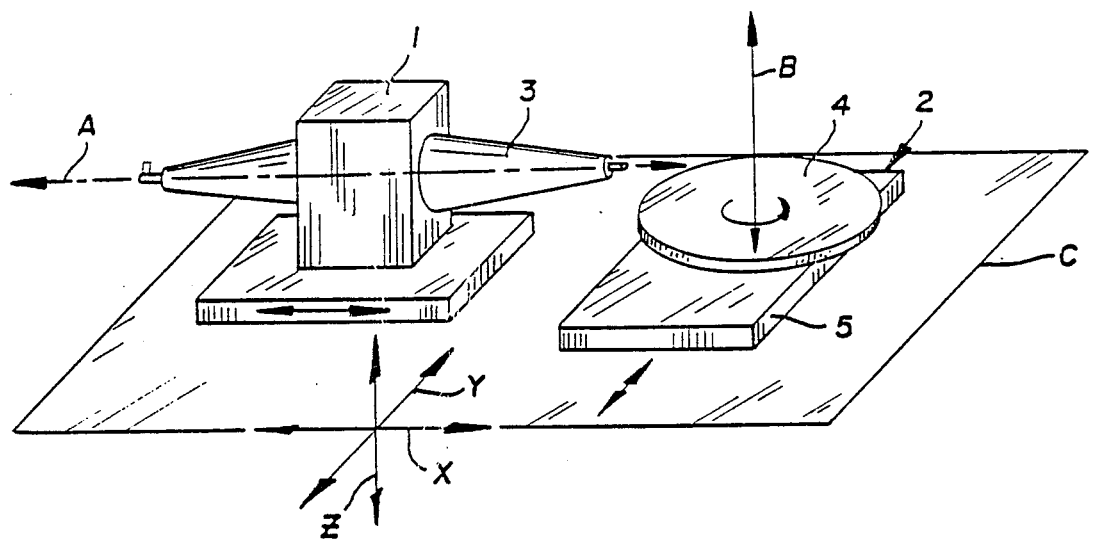
FIG. 1 is a simplified representation of the basic elements and their relative arrangement required for the operation of the preferred embodiment of this invention.

The invention described herein can be described as a composite of pieces and method for using them so as to create a system for making lenses. It should be apparent to those skilled in the art that variations in materials and form which are capable of acting in the same way to produce the same result are within the teachings of this patent. Reference should first be had to FIG. 1 for an overall description of the preferred embodiment, in which a planar base C (which could be considered a support structure) has perpendicular direction lines X and Y located therein and a directional line Z perpendicular to X and Y (and to plane C). Base C supports the two major elements, 1 and 2. Element 1 is capable of translational motion parallel to line X (of plane C) and is a machine capable of rotatably driving a spindle 3 about an axis A. Axis A is also parallel to line X, above plane C. The translational motion of element 1 is adjustable to within 1/1000 of an inch accuracy. During the operation of the invention for lens grinding or other purposes disclosed herein, element 1 remains motionless in this parallel to X axis translational direction. Element 2 comprises a translational chasis 5 capable of motion in a direction parallel to direction line Y. This translational motion of chasis 5 is also adjustable to within 1/1000 of an inch accuracy. Mounted atop chasis 5 at a level below axis A (vis-a-vis support base C) is a stage 4 (a part of element 2). This stage 4 is controllably and smoothly rotable in both directions with substantially no backlash about an axis B (which is parallel to axis Z.) Such rotation may be performed in either angular direction for any sized arc. A transmission which fits into this description to support this motion of Stage 4 is available from Harmonic Drives, Inc. (Embart Machinery Group, Harmonic Drive Division, Wakefield, Mass.). However, any construction or mechanism capable of providing the movement stability just described to a high degree of accuracy would be acceptable for the purposes of the this invention.

Figure 2A:
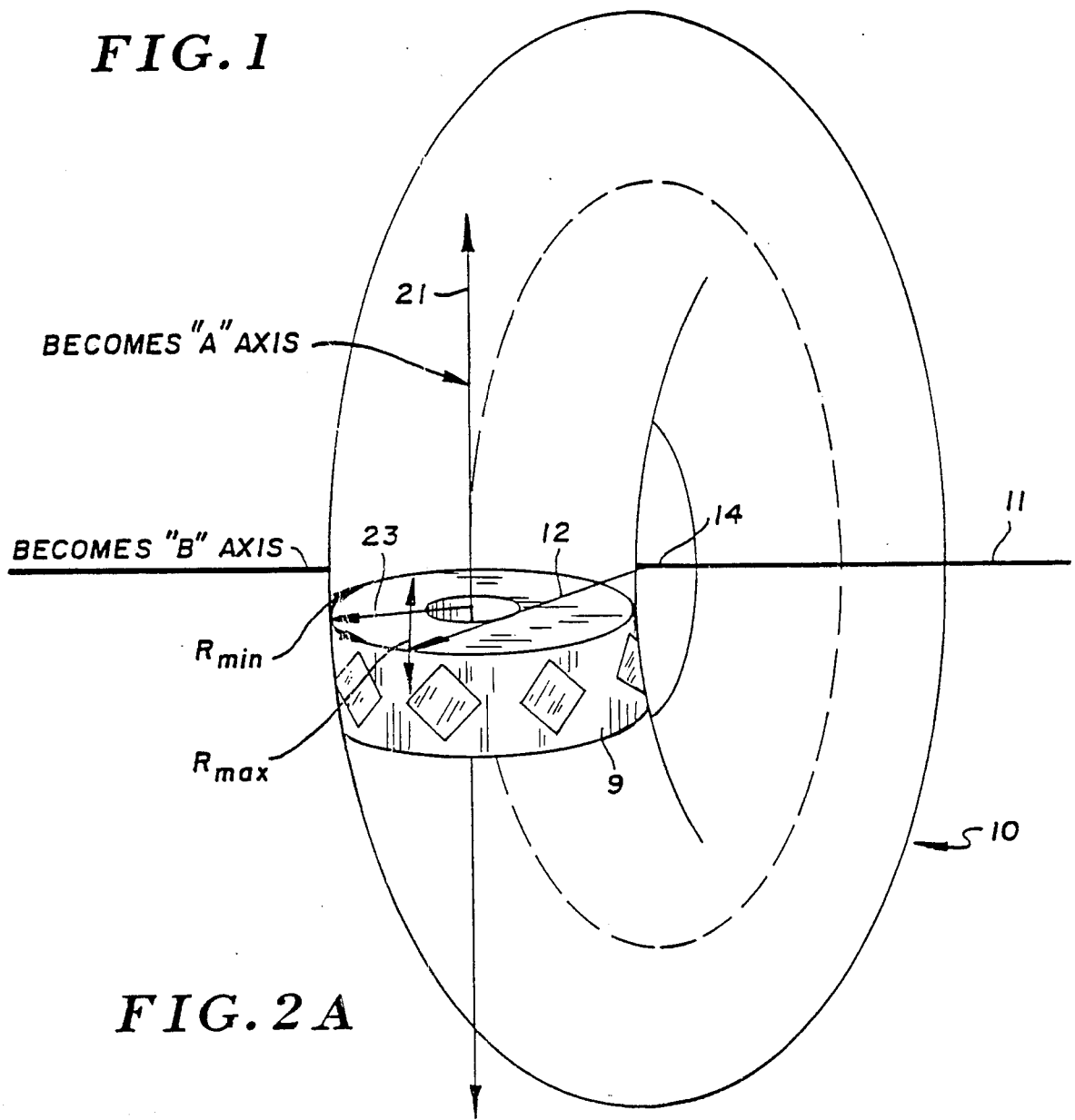
FIGS. 2A and 2B are heuristic representations of the theoretical doughnut on whch the levels are "cut" and of the holding fixture on which the lenses are mounted for shaping, lapping, and polishing.

Referring now to FIG. 2A, a rough heuristic representation of a Torus 10 is shown from which is cut a segment to be used as a representative lens holding fixture 9 for holding the lenses for shaping, grinding, and polishing. The major radius (Rmax) 12 begins at central point 4 and describes the largest circumferential line of the doughnut 10. (Line 11 the origin of radius 12 is the major axis of the Torus and will become Axis B in the system as shown later.)

The holding fixture 9, a segment from the Torus 10, is also described by a minor radius (Rmin) 23 which describes a circle 25, the projection of which around major axis 11 describes the entire Torus 10. (Note that this geometry is more easily understood from this illustration than one in which the actual ratio of sizes of the major radius 12 and minor radius 23 may approach unity, as would ordinarily be the case where only slight toricity/eccentricity is required.) The holding fixture actually used need merely support the lenses such that their major and minor radii can be found at the surface of the holding fixture; any truncation or modification of the doughnut shape which allows this is acceptable, (see the preferred embodiment, holding fixture for a description of an actual embodiments.) Radius 23 originates at center point 26 through which extends minor axis 21. Minor axis 21 will be mounted on spindle 3 adjacent to shoulder 7 of FIG. 3 such that minor axis 21 and axis "A" of element 1 are the same. Axis 11 is then identified with "B" on the machine.

To illustrate how alignment of the tooling and holding fixture can be accomplished in this invention, reference should be had to FIG. 3 in which elements 1 and 2 are again shown. Spindle 3 is shown with a reference sphere 31 mounted to shoulder 7, firmly over collar 8. Point 9 is the center of reference sphere 31, and the center line runs through a diameter of the reference sphere 31, and through or immediately adjacent to shoulder 7. A machinist dial indicator or equivalent sensor/meter 32 measures the distance between the external surface of reference sphere 31 and a point 33 at an arbitrary fixed distance "d" from axis B (axis of rotation of Stage 4) on the surface of stage 4. Slight rotation of stage 4 with the tip 22 of meter 32 being still directed at (and in contact with) the surface of reference sphere 31 will show different measurements if the center line of reference sphere 31 is not located directly over axis B. Appropriate adjustment of the position of element 1 or 2 should be made so that axis B lines up with the center line of sphere 31. Through several interations, elements 1 and 2 are adjusted until the reading on meter 32 is the same for all points about the reference sphere 31. When the acutal lens holding fixture is mounted onto shaft 3, at collar 8 against shoulder 7, the center line of this actual holding fixture's mounted lenses will be exactly one half the width of the holding fixture away from axis B. By knowing the exact width, element 1 can be moved over exactly (to its accuracy) one half that distance, to align the center of the holding fixture (and thus its mounted lenses) with axis B by this adjustment to element 1.

Lens blanks may be cut as sections of a square (or other appropriately shaped) length of glass or other suitable material.

In the preferred embodiment the lenses should be in a square shape with a shaved corner for easy insertion and removal from the holding fixture in a manner that will indicate the orientations of the different radii of curvature. See for example FIG. 8 in which a lens 41 is shown with lines 15 and 16 indicating the orientation of the minor radius and major radius, respectively, of the lens upon its completion.

These lens blanks are mountable on a holding fixture as described in FIGS. 5A, 5B, 5C and 5D. The lens blanks are mounted within locating pockets (like pocket 42A in 5A and 5B and shown in bold in 5C as pocket 42C), to guarantee centration. Sacrificial "chumbs" of the same material as the lens blanks are inserted in the holes surrounding each pocket like holes 43A, 44A, 45A, 46A of FIGS. 5A and 5B. Their function is to provide a smooth transition of the tooling when drawn from one lens surface to the next during the lapping and polishing cycles.

The base material which comprises the doughnut is an appropriately machined circular metal ring (holding fixture 39A in FIGS. 5A and 5B and holding fixture 39C in FIG. 5C). FIG. 5B provides a cross-sectional side view of holding fixture (metal ring) 39A. The raw lens blanks may preferably be mounted within waxed pockets (such as pocket 42A). Ths side of the lens which is to remain flat (previously polished) is mounted to shoulders (such as shoulder 47A in FIGS. 5A and 5B and shoulder 47C in 5C) created by the absence or removal of material from the pockets. Note that in order to achieve proper centricity in the major and minor radius acrs, the lenses blanks must be mounted on flat shoulders with their exact center (to within 0.001 inches) exactly tangent to a circle whose circumference is defined to be smaller than the minor radius by the finished thickness of the lens, and exactly perpendicular to radii originating from the axis 21 (FIG. 5A). Thus, the holding fixture must be very carefully machined so that the shoulders of the the waxable pockets define a surface properly tangent to the radius based circles just described. The chumbs, need not be mounted as critically as the lenses. These chumbs are provided to prevent chipping of the lens during the processes of lapping and polishing, which might otherwise occur due to pressurized tooling coming into contact with the free-standing edge of a lens. Chumbs need merely to be inserted so that their external face is at about the same distance as the lens blank's outer surface from the center of the holding fixture.

The use for the wax channels can be described as follows. The mounting of a lens blank, say for example lens blank 41, is accomplished by first wetting the pocket seats with warmed wax. While the wax is warm, the lens blank like lens 41 is then pressed into the "seat" provided by the shoulders.

The residual wax and trapped air are forced out of the pockets and overflow into the residual wax chambers (as for examples, 48A, in FIGS. 5A and B and 48C in FIG. 5C. (Note the air release apertures 49A and 49C). An exemplary way to do this is described with reference to FIG. 5D in which the lens blank 51 is pressed onto shoulders 53 and 52 by means of soft plastic screw 101, which is twisted into support ring 100. Support ring 100 is only used for the purpose of securing the lens blanks into the holding fixture 39A and comprises generally a ring 100 with threaded holes (such as hole 104) appropriately spaced directly above the wax channels around doughnut 39A such that a screw such as screw 101 would press down upon the approximate center of each lens when each screw is tightened and ring 100 surrounds a holding fixture such as 39A. In FIG. D, the lips 54 and 55 extending above the shoulders 52 and 53 are shown. Note that fixture 39A is held centered by a shaft 103 which is concentric to ring 100. Warming the assembly and tightening the screws seats all the lenses. Note also that chumbs should be installed before mounting lenses so that they do not cause lenses to lose pressed seating described above.

Figure 2B:
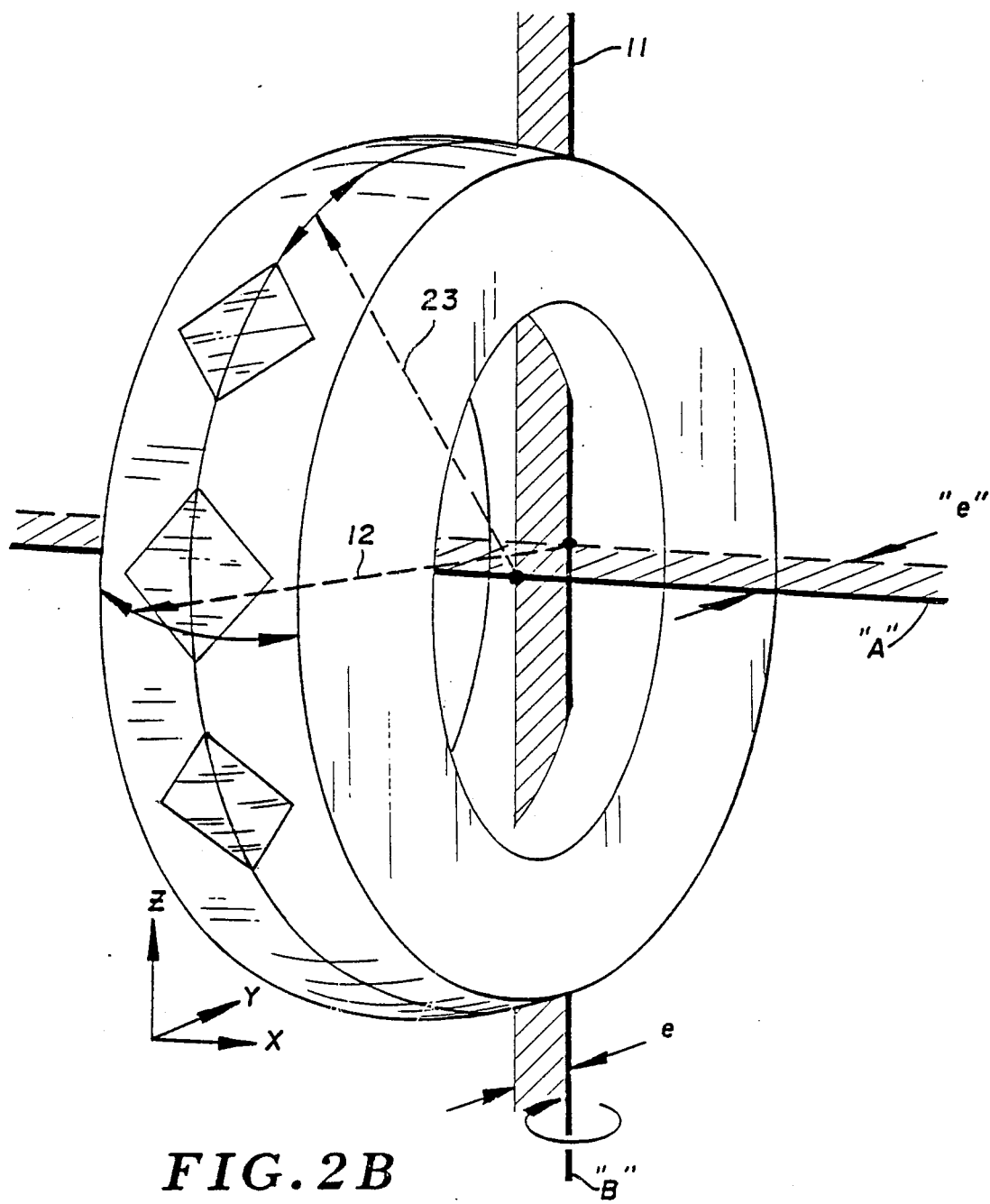
Figure 6A:
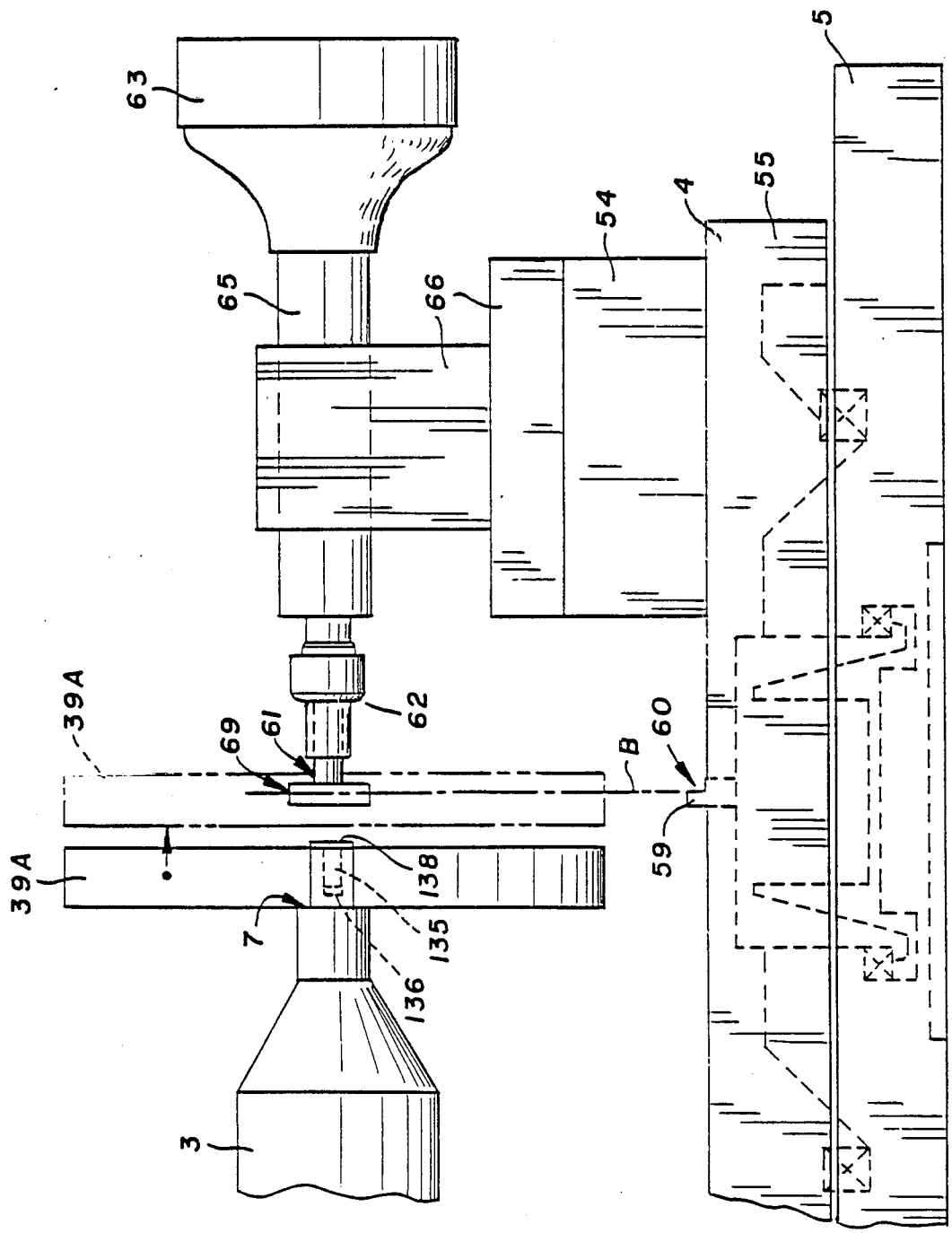
FIG. 6A is a side view which illustrates a turbine drive which may be mounted on the rotatable stage (as described in FIG. 1) for driving the diamond wheel tooling of the preferred embodiment, showing its approximate relation to the other elements of the invention's preferred embodiment.
Figure 6B:
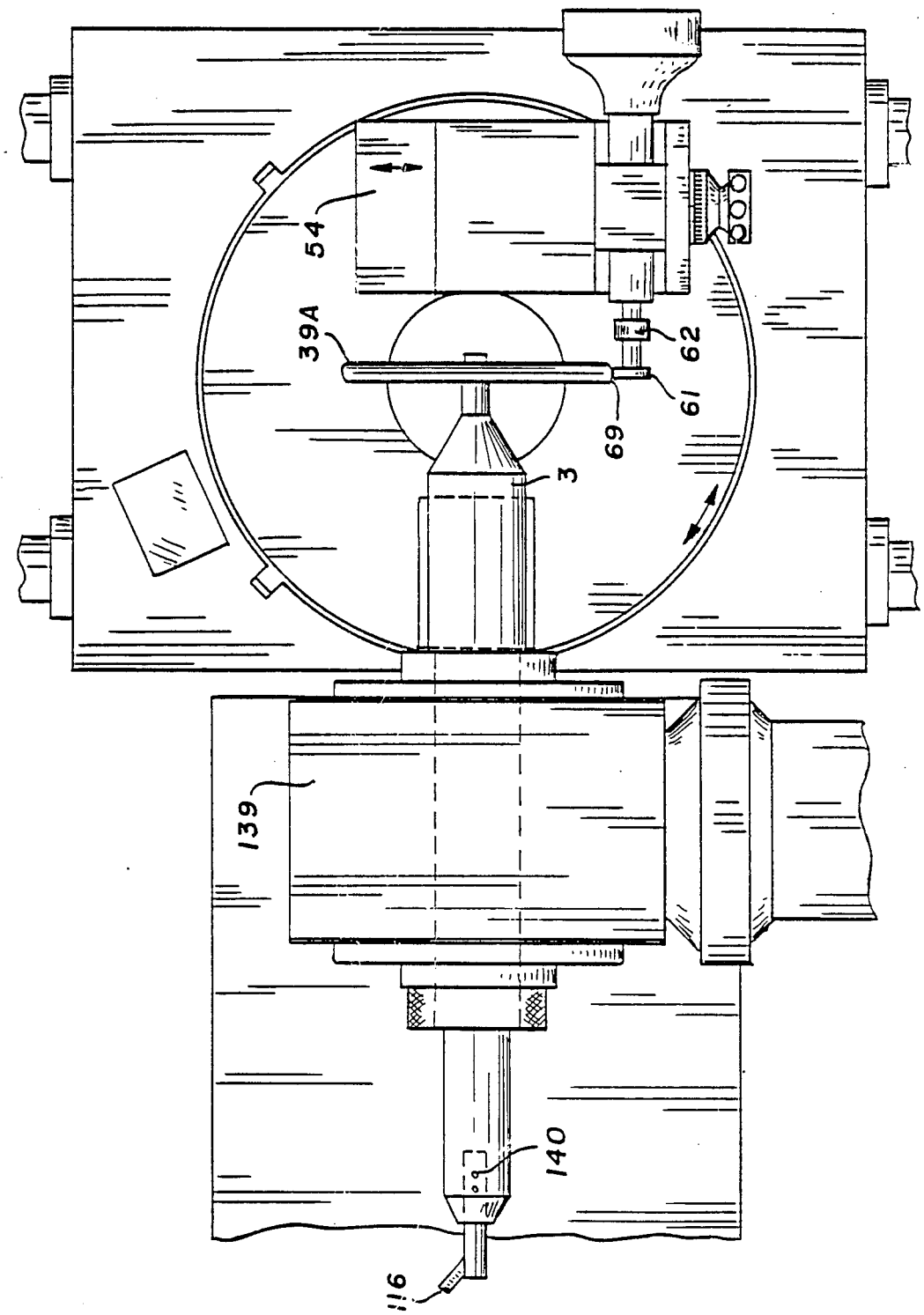
FIG. 6B is a topview.

After mounting in a manner substantially similar to that just described or in any other fashion which achieves the required configuration, the rough shape of the lenses may now be made by a diamond wheel 61 of FIG. 4A. The diamond wheel in the preferred embodiment is mounted by a chuck on a shaft or drive axle 62 of FIGS. 6A and B and turned by an air turbine 63 (which may be powered by means of compressed air). The drive axle 62 is encased in an enclosure 65 and mounted on a mount 66 which is suitable for fixable firm mounting onto the surface of a precision dovetail slide 54. The dovetail slide 54 allows the diamond wheel 61 to be positioned over a 4-inch range in 0.001 inch increments radially to the B axis. The "B" axis is equivalent to axis 11 of FIG. 2 and is physically represented in the preferred embodiment by a line extending along the planar surface 60 of halved center pin 59, extending through the axis of rotation of stage 4, normal thereto, and shifted by a displacement "e" (in the y direction per FIG. 2B) due to the movement of the dovetail slide 54 by an amount equal to e. This displacement yields the toricity desired. Thus, with reference to FIG. 2B the displacement e is the difference between Rmin and Rmax. Once fastened securely by mount 66 to the upper surface of element 2, the diamond wheel edge 69 is brough into contact with the outer surface of holding fixture 39A (and the lenses mounted on its outer edge). This is accomplished by mounting the mount 66 such that rotation of stage 4 will drive the tangent surface 69 of diamond wheel 61 in an arc described by the major radius (Rmax) of the doughnut being generated. Rotation of the diamond wheel 61 around this arc (by rotation of stage 4) should occur at the same time that roatation of holding fixture 39A is accomplished by means of rotating shaft 3 of element 1. Two diamond wheels are ordinarily used in succession, one of larger grit size for rough cutting, the next with fine diamond grit to remove the pitting caused by the roughing operation. 80 grit may be used for roughing 400 for fining in the preferred embodiment.

After roughly shaping the optical surface of the lenses on the holding fixture 39A, the lenses must be lapped and then polished. FIG. 4B describes a block 110 and a cutting tool 115 oriented approximately as they would be for the cutting tool 115 to generate a shape in the surface of block 110 such as that illustrated in FIG. 4C by block 11. (The block 110 is machined into a conical shape first to provide for added stability and clearance). Cutting tool 115 has a cutting tip 116 and is mounted on spindle 3. In the preferred embodiment the spindle 3 is reversable to provide for two kinds of "ends" so that mounting of both the holding fixture 39A (by means of insertion holding cap 135-insertion into aperture 136 FIG. 6A) and mounting of the cutting tool 115 may be accomplished. To allow for this a worn gear transmission with a hollow shaft (not shown) has been provided in the housing 139 of element 1. However, spindle 3 provides for the mounting of the cutting tool 115, tip 116 should describe a circle of radius Rmin when spindle 3 rotates. The cutting tool may be held in place by set screws 140.

Thus, rotating spindle 3 cuts surface 112 on block 111 (as shown in FIG. 4C), when the block is duly located and mounted on an appropriately placed piston which rotates about axis B as will be explained later with reference to FIG. 7. FIG. 4D describes a block 113 with cutting tool 114 protruding therefrom. Note that each of the blocks 110, 111, and 113 are machined with transverse ridges 118 and 119 and threaded aperture 120 for immovable attachment to the piston cylinder in a kinematic fashion. FIG. 4E describes a wheel 121 from which the pitch-forming doughnut 122 of FIG. 4F is generated. Generation of the doughnut of FIG. 4F occurs through the use of the block 113 with cutting tip 114 of FIG. 4D when said block and cutting tool assembly is mounted on the piston cylinder (not shown), and wheel 121 is mounted on spindle 3. The purpose of mounting cutters on spingle and pedestal tooling is for the generation of precise specified surfaces onto the lapping and polishing tools which will utlimately transfer that specified surface to the lenses. Precise surfaces also eliminate break-in time required to get the lens surface to mate to the tooling surface.

Figure 7A:
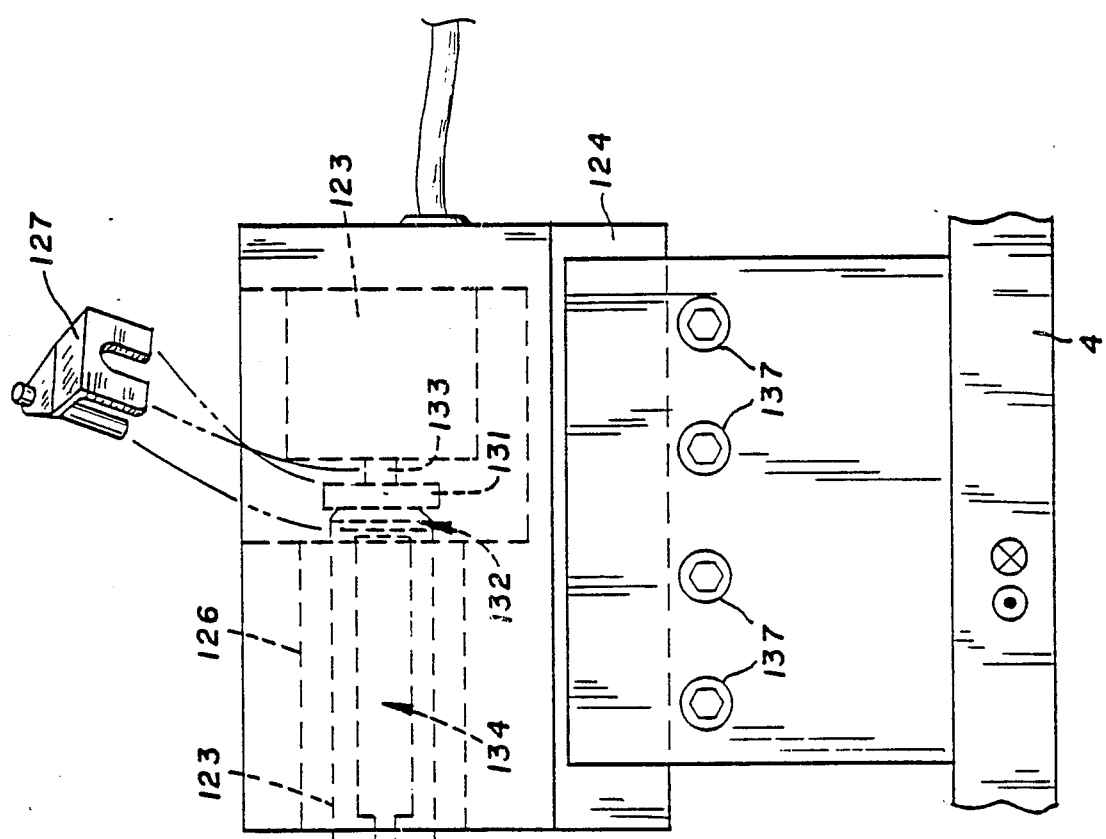
FIG. 7A is an exploded view of the preferred embodiment of a positioning piston and one of the tools used for polishing. It is shown mounted to a portion of the rotatable stage as it would be during use for the preferred embodiment.
Figure 7B:
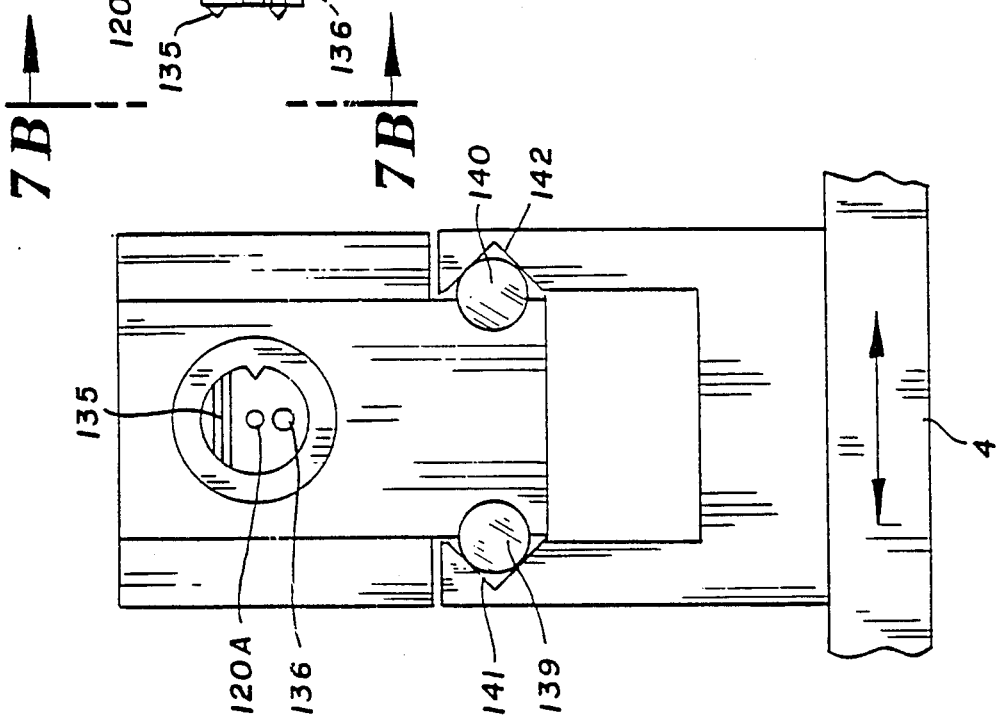
FIG. 7B is a 90° rotated view of the same thing taken at line 7B—7B.

Reference to FIG. 7 should be had for a more complete description of the functioning of the block tools and cutting tool described with reference to FIGS. 4B, 4C, 4D and the wheel of 4E and doughnut of 4F.

FIG. 7 illustrates the mounting of the cylinder 123 in an exploded view upon the pedestal stage 4. The cylinder is mounted in a carriage 124 and supplied a regulated amount of air pressure through a supply means (not shown) through air pressure supply hose 125. Cylinder 123 is fitted into cylinder aperture 126 and held in place by cross piece 127 such that air pressure forces cylinder 123 outwardly from cylinder aperture 126 (in a unique orientation as guaranteed by keyway 130) to the point where it can go no further because of actuator flange 131. It is held in place by cross piece 127 which fits snugly in hole 132 and loosely stradles bar 133 of actuator flange 131. Air pressure of roughly 80 psi has been found suitable for the materials used in this invention, but this pressure could be varied with the materials used in the preferred embodiment and further varied where different materials are used. Cylinder 123 is hollow and will admit a screwdriver into the hollow 134 thereof to drive a screw into the threaded aperture 120 in the block. The blocks like block 110 are fitted with two transverse retaining kinematic ridges 118 and 119 which together with the tightened screw hold the block 110 firmly and in a unique position aginst the mating ridge 135 and cone 136. Mounting the cutting tool 115 on the spindle 3 and causing the tip 116 to move in an arc by the rotation of spindle 3 as stage 4 is rotated, the cutting tool 115 will generate the exact shaped surface 112 as illustrated in block 111. (Provided, of course, that the tip of the cutting tool is set at the same distance that the major radius is from the center of spindle 3. This tool, block 111, generated in this manner, may be used to lap the shaped lenses on the holding fixture. (The forward end of block 110 should be milled into a shape by milling sides 135 through 139 before the block is mounted to the block 110 clears the arber of spindle 3 at extremes of the arc of stage 4.)

Polishing tools may be formed in exactly the same manner simply using a different substrate for block 110, such as a plastic or micarda (linen phenolic).

Generating the appropriate shape for the pitch used to polish the lenses in the holding fixture 39A (when its is applied to a surface such as surface 112), employs a preshaping doughnut 122. This doughnut may be formed by the use of a cylindrical wheel 121 of a diameter equal to (or greater than) Rmin, such as that illustrated in FIG. 4E. This cylindrical wheel is mounted on spindle 3 and subjected to the tip of block 113. Cutting tip 114 when mounted on cylinder 123 in cylinder assembly 136 and rotated on stage 4, generates an arc which is substantially the Rmax or major radius which the final lens will have (The minor radius also (half the diameter of 122) could be changed by controlling the distance of the cutter tip 114 from axis "A".)

Reference back to FIG. 7 should be briefly made to illustrate how movement of the cutter tip toward or away from the surface of the holding fixture is accomplishable.

Base 135 is firmly fixed to stage 4 and rotates about axis B by rotating stage 4. Loosening and sliding the carriage 124, then retightening the clamping screws 137, loosens and retightens the pressure on bars 140 and 139 which are integrally formed with carriage 124. The pressure is supplied by the inward movement or outward movement of grooves 142, 141 in response to the tightening or loosening of the clamping screws 137.

For polishing and lapping, approximately 38 p.s.i. of air pressure is used. Once the doughnut 122 is shaped, the polishing tool, block 113 may be attached to cylinder 123 and roughly swabed with pitch of the appropriate hardness. As is generally known, pitch is a tar like substance. Forcing pitched block 113 against the newly created doughnut 122 will generate the appropriate surface shape for polishing the lenses in the holding fixture 39A. Once this step is accomplished of course, the polishing tool may be used to polish the lenses in the same holding fixture. It is believed that all the requirements for a system to polish, lap, and shape very small toric lenses has been thus described. It can be seen that simple efficient and economical means has been described to provide the intermediate tooling required for generating the appropriate shapes and tools to accomplish the generation of these toric lenses. It should be understood that various changes in the construction and arrangement of parts may be made by those skilled in the art without departing from the spirit of the invention and that the invention is not limited to the exact matter shown and described which have been given for the purposes of illustration.

I claim:

1. Apparatus for shaping an optical quality lens having a surface described by first and second arcs that cross at the center of said lens wherein said arc is described by a radius $R_{min}$ and said second arc is described by a radius $R_{max}$, wherein $R_{max}$ is greater than $R_{min}$, comprising:

means for holding at least one rough optical surface, said means for holding having a first center point and having a first rotation axis passing through said first center point;

means for rotating said holding means about first axis of rotation;

a grinding tool, said tool being in the shape of a cylinder having an end which lies in a plane, and having a curved side, said curved side defining a circular cross-sectional shape of said cylinder, said tool having a grinding surface, said grinding surface being formed entirely on said curved side of said tool, with substantially no portion of said grinding surface being formed on said end of said tool, said grinding tool having a second axis of rotation;

means for rotating said grinding tool about said second axis of rotation;

means for moving said grinding tool along a path wherein said grinding surface defines a circular arc, said circular arc being described by a radius substantially equal to $R_{max}$, said arc defining a second center point wherein said rough optical surface, when mounted on said holding fixture, contacts said grinding surface to define a plane of tangency therewith, said rough optical surface remaining entirely on one side of said plane of tangency while said grinding surface is contacting said rough optical surface; and means for positioning said first axis of rotation with respect to said second axis of rotation wherein when said grinding tool is colinear with said first center point and said second center point, the distance from said circular arc to said first center point is equal to $R_{min}$.

2. An apparatus, as claimed in claim 1, further comprising:

means for mounting a cutting tool to said means for rotating said holding means;

means for mounting a block to said means for moving said grinding tool wherein said cutting tool describes a surface on said block substantially parallel to said lens surface.

3. A kit for generating a multiplicity of finished lenses having surfaces defining a torus with different major and minor radii simultaneously, comprising:

first and second elements movable in linear directions perpendicular to one another's movement and adjustable in these directions to a very high degree of accuracy;

said first element having a spindle for rotating about an axis of rotation parallel to said direction of linear movement of said first element;

said second element for holding a grinding tool said tool being in the shape of a cylinder having an end which lies in a plane and having a curved side, said curved side defining a circular cross-sectional shape of said cylinder, said tool having a grinding surface, said grinding surface being formed entirely on said curved side of said tool, with substantially no portion of said grinding surface being formed on said end of said tool, said second element being rotatable about an axis of rotation which is (a) perpendicular to its linear direction of movement and (b) perpendicular to the linear direction of movement of said first element, and to the axis of rotation of said spindle;

a holding fixture having a surface and a rotation axis, the distance from said holding fixture axis to said holding fixture surface being no greater than $R_{min}$ constructed such that the major and minor axes of each of said toric lenses when finished describe the major axis of the torus when said lenses are mounted thereon;

a driven rotatable shaft mountable to said second element such that said rotatable shaft may be rotated on an axis perpendicular to the axis of rotation of said second element and such that said grinding surface having a radius and mounted perpendicularly to said shaft describes an arc said grinding-tool defined arc being substantially equal to $R_{max}$ when said second element is rotated about its axis of rotation wherein said lenses, when mounted on said holding fixture, contact said grinding surface to define a plane of tangency therewith, said lenses remaining entirely on one side of said plane of tangency while said grinding surface is contacting said lenses;

a pressure actuator piston mountable upon said second element wherein tooling attached thereto describes the same arc described by the surface of said grinding surface;

means for mounting a block to said actuator piston;

means for mounting a cutting block containing a cutting tip as tooling to said actuator piston;

a cutting tool mountable to said spindle of said first element;

a shaping wheel; and a cylindrical blank for forming a tool for shaping a polishing tool surface, mountable on said first element axis.

4. An assemblage for generating a surface having optical quality in the shape of a portion of a surface of a torus which is described by two arcs that cross at the center of said surface and wherein said arcs are described by radii of different lengths such that Arc 1 is described by a radius $R_{min}$ and Arc 2 is described by a radius $R_{max}$, comprising:

fixture means for holding at least one rough optical surface, wherein said fixture means has an axis for rotation thereof and a radius, said radius being no greater than $R_{min}$, spindle means for continuously rotating said fixture means about said axis for rotation which defines the origin of $R_{min}$, rough shaping tool, said tool being in the shape of a cylinder having an end which lies in a plane and having a curved side, said curved side defining a circular cross-sectional shape of said cylinder, said tool having a rough shaping surface, said rough shaping surface being formed entirely on said curved side of said tool, with subtantially no portion of said rough shaping surface being formed on said end of said tool, means for rotatably mounting and rotating said shaping tool about an axis, means for drawing said rough shaping surface across and tangent to said rough optical surface, defining a plane of tangency, wherein said rough optical surface remains entirely on one side of said plane of tangency while said rough shaping surface is being drawn across rough optical surface and wherein said means for rotatably mounting and rotating produces a motion perpendicular to said Arc 2 which occurs simultaneously with drawing said rough shaping surface along Arc 2 defined by radius $R_{max}$, thus creating a shaped optical surface wherein $R_{min}$ is less than $R_{max}$, lapping tool shaped to fit said surface having optical quality, polishing tool shaped to fit said surface having optical quality, and means for moving said rough shaping, lapping and polishing tools to a position against said rough and shaped optical surface and simultaneously moving them along said arc defined by said radius $R_{max}$ of said surface having optical quality.

5. An assemblage, as claimed in claim 4, wherein:

said lapping tool is shaped by mounting a lapping tool blank on said means for drawing said shaping surface to produce a lapping tool described by a first radius substantially equal to $R_{min}$ and a second radius substantially equal to $R_{max}$.

6. An assemblage, as claimed in claim 4, wherein:

said polishing tool is shaped by mounting a policing tool blank on said means for drawing said shaping surface to produce a polishing tool having at least one surface described by a first radius substantially equal to $R_{min}$ and a second radius substantially equal to $R_{max}$.

* * * * *